June 14, 1960 F. E. SWINDELLS 2,941,104

ELECTROLUMINESCENT STRUCTURES

Filed Nov. 20, 1958 2 Sheets-Sheet 1

FIG. I

INVENTOR

FRANK EVANS SWINDELLS

BY Lynn Barratt Morris

ATTORNEY

June 14, 1960 F. E. SWINDELLS 2,941,104

ELECTROLUMINESCENT STRUCTURES

Filed Nov. 20, 1958 2 Sheets-Sheet 2

INVENTOR

FRANK EVANS SWINDELLS

BY Lynn Barratt Morris

ATTORNEY

United States Patent Office 2,941,104 Patented June 14, 1960

1

2,941,104

ELECTROLUMINESCENT STRUCTURES

Frank Evans Swindells, Maplewood, N.J., assignor to E. I. du Pont de Nemours and Company, Wilmington, Del., a corporation of Delaware Filed Nov. 20, 1958, Ser. No. 775,231

8 Claims. (Cl. 313—108)

This invention relates to structures for luminescence and, more particularly, to improved structures for electroluminescence. Still more particularly, it relates to flexible electroluminescent structures which are comprised of superior binder materials.

When certain materials, i.e. phosphors, are placed in a fluctuating electric field under proper conditions, they are excited to luminescence and continue to emit light as long as the exciting field is maintained. This constitutes the phenomenon of electroluminescence. This phenomenon has been put to practical use in the form of various electroluminescent structures which comprise essentially a phosphor placed between two electric conductors across which a suitable voltage may be applied, due provision being made for the transmission of the light emitted by the phosphor.

The prior art discloses many different types of electroluminescent structures, but generally they are of the rigid type. U.S. Patent 2,765,419, issued to Roberts, for example, teaches that electroluminescent cells have been limited as to their materials of construction, i.e., to form a transparent conducting layer tin oxide had to be coated on glass rather than on more desirable plastics because the tin oxide could not be made to adhere to the plastics. In addition in other structures, metal oxide coatings, which served as light-transmitting electrodes, were formed at such high temperatures that only certain materials, e.g., glass, ceramics, etc. could withstand the heat without damage.

U.S. Patent 2,733,367, issued to Gillson, teaches that light-transmitting, flexible electroluminescent structures can be prepared using thermoplastic polymeric films, e.g., polyethylene terephthalate films. Polyethylene terephthalate serves as the phosphor-bearing dielectric layer and is also used to cover the dielectric binder on each planar surface. The latter polyethylene terephthalate films are then coated, by vacuum evaporation techniques, with metal to provide light-transmitting flexible metal film electrodes. While the devices of Gillson are flexible, of low cost, and of lightweight construction, the coated metal film electrodes, when deposited to a depth sufficient to insure adequate electrical conductivity, do not transmit as much incident visible light as is desired by those versed in the art.

An improvement in light-transmitting properties of the Gillson metallic coatings without impairing their electrical conductivity is taught by Meloon et al. U.S. application Serial No. 743,567 filed June 23, 1958. Meloon et al. disclose that by vapor depositing copper or preferably a bi-metallic layer on a film and/or dielectric substrate the visible light transmission and electrical conductivity are improved. The bi-metallic layer electrodes, for example, when capable of transmitting at least 30 percent of the incident visible light, exhibit surface resistivities of less than 300 ohms per square.

An object of this invention is to provide an improved electroluminescent structure capable of emitting visible light. Another object is to provide flexible electroluminescent structures composed of superior binder materials. A further object of this invention is to provide strong electroluminescent structures with good light output and long operating life. A still further object is to provide improved electroluminescent structures having high dielectric constants, good adhesion, moisture resistance and stability. Other objects will appear hereinafter.

2

These objects are accomplished by the present invention which provides a flexible electroluminescent structure comprising a transparent hydrophobic macromolecular polymer film base or support coated in order with a light transmitting electrically conductive bi-metallic layer, a dielectric binder-phosphor layer consisting of a mixture of the following resins: 30 to 75 percent melamine-formaldehyde, 5 to 50 percent of a phthalic acid alkyd, and 5 to 50 percent of a polyester corresponding to that made from (1) a saturated aliphatic polyhydric alcohol of 2 to 3 hydroxyl groups, including glycerol and polymethylene glycols of 2 to 10 methylene groups, e.g. ethylene glycol, hexamethylene glycol and decamethylene glycol and (2) a saturated aliphatic dicarboxylic acid of 6 to 10 carbons, e.g. adipic, suberic, azelaic and sebacic acids, with from 15 to 70 percent of phosphor particles, based on the weight of the phosphor-binder layer, and an electrically conductive metallic layer in intimate contact with the binder-phosphor layer. Additional layers may be added to increase reflectance and to protect the metallized base support.

Use of the melamine-formaldehyde binder produces improved and unexpected results. It enables a higher light output to be obtained from the structure. In addition, by the utilization of such a resin binder composition, the adhesion and the moisture resistance qualities are excellent, the stability of the structure is improved, and the flexibility of the structure is more easily controlled.

The invention will now be specifically described with reference to the accompanying drawings wherein.

Figure 1:
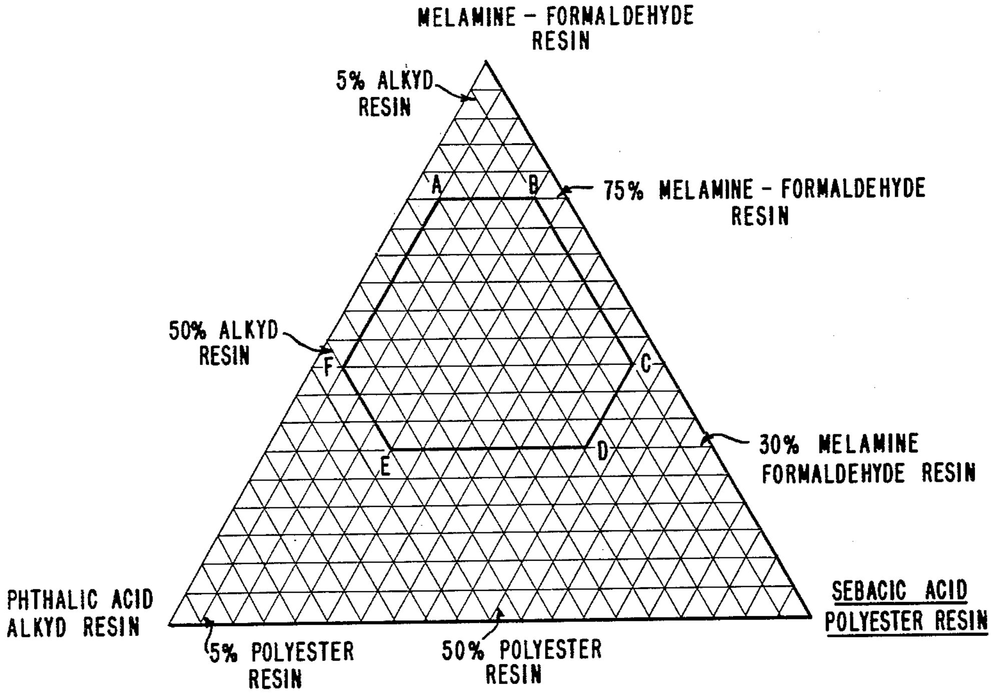
Figure 1 is a three-component diagram showing the composition ranges of the resins within polygon ABCDEF in the phosphor-binder layer.
Figure 2:
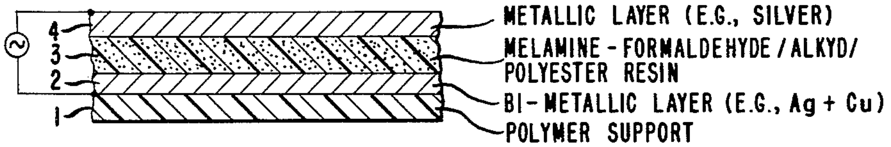
Figure 2 is a cross-sectional view of an electroluminescent structure of the present invention.

Referring to Figure 2, the base support 1 consists of a flexible sheet of a thermoplastic organic macromolecular polymer film, preferably polyethylene terephthalate. Superimposed thereon is a transparent conductive bi-metallic layer 2, preferably silver coated on copper, which is capable of transmitting at least 35 percent of all incident visible light and has a surface resistivity of not more than 40,000 ohms per square. The light-emitting layer 3 comprises a mixture of resins of the above-defined composition in which are embedded particles of an electroluminescent phosphor, preferably of the zinc sulfide type. A resin mixture of 50 percent melamineformaldehyde, 20 percent alkyd, and 30 percent polyester is especially preferred. Layer 4 is an electrically conductive metallic layer, preferably of silver, in intimate contact with the electroluminescent element 3. The metallic layers are connected through suitable wires or other electrical conductors to a source of alternating current as schematically shown in the drawing.

Figure 3:
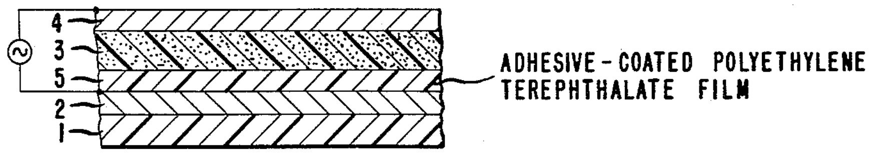
Figures 3, 4 and 5 are cross-sectional views of additional modifications.

Figure 3 is an optional modification of Figure 2 wherein a thin pressure-sensitive adhesive coated polyethylene terephthalate film 5, preferably 0.5 mil thick, is inserted between the electroluminescent layer 3 and the transparent conductive metallic layer 2 to protect the latter from hydrogen sulfide contamination.

Figure 4:
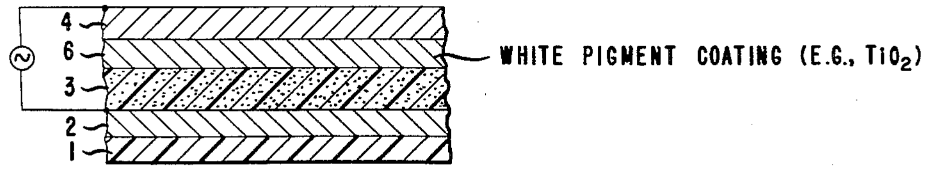

Figure 4 is another optional modification of Figure 2 wherein a reflective white pigment surface 6, preferably TiO$_2$, is included between the electroluminescent layer 3 and the electrically conductive metallic layer 4 to act as a light-reflecting layer.

Figure 5:
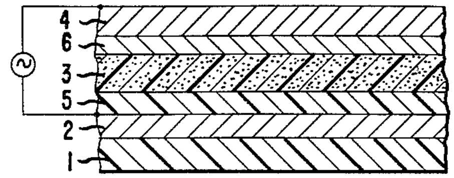

Figure 5 is an optional modification of Figure 2 wherein both the white pigment surface 6 and the polyethylene terephthalate film 5 are utilized in the same structure occupying their same relative positions as described under Figures 3 and 4.

It is to be understood that both layers 5 and 6 are optional features not necessary for the operation of the invention and either or both can be included or omitted as may be desirable under the circumstances.

In all of the above described structures (Figures 2–4) visible light is emitted and observed when an alternating current field is applied across the electrically conductive elements 2 and 4.

The invention will be further illustrated by, but is not intended to be limited to, the following examples.

*Example I*

Three strips of polyethylene terephthalate film (5 mil) are placed in a vacuum evaporator and about 5 mgs. of copper, equivalent to about 0.0015 mg./cm.$^2$, is evaporated and deposited on the surface. Thirty-two mgs. of silver, equivalent to about 0.01 mg./cm.$^2$, is then evaporated and deposited on top of the copper substrate. The resistance of the composite metal layer is of the order of about 20 ohms/square and the optical density is 0.3 to 0.5.

A binder solution is prepared from a thoroughly stirred mixture of 120 g. of a melamine-formaldehyde resin (50±2 percent solids) made from 1 to 6 moles of formaldehyde per mole of melamine (i.e. 30 to 180 parts of formaldehyde per 127 parts by weight of melamine) in xylolbutanol solvent (1:4). This resin has an acid number based on solids of from 0 to 2, a specific gravity of 0.98, and is colorless and clear ("Uformite" MM–55, mfd. by Rohm & Haas Co., Phila. 5, Pa.); 39 g. of a phthalic acid-glycerol alkyd resin modified with 33 percent by weight of coconut oil (60 percent solids) in xylol which has an acid number based on solids of from 4 to 10 and which contains 47 percent by weight of phthalic anhydride based on solids ("Duraplex" ND–77B, mfd. by Rohm & Haas Co., Phila. 5, Pa.); and 36 g. of a castor oil-modified sebacic acid-glycerol polyester resin (100 percent solids) which has an acid number based on solids of from 0 to 3.5 ("Paraplex" RG–8, mfd. by Rohm & Haas Co., Phila. 5, Pa.). The binder solution contains a total of about 61 percent solids comprised of approximately 50 percent by weight melamine-formaldehyde, 20 percent by weight alkyd and 30 percent by weight polyester resins on a solids basis.

Sixty-five (65) grams of the mixture is ball milled with 60 g. of a green-fluorescing electroluminescent zinc sulfide phosphor prepared as described in Example 4 of assignee's Swindells U.S. application Serial No. 713,548, filed February 6, 1958, and then cast with a doctor knife to a wet thickness of 5 mils, on the metallized film previously described, the edges of which are marked off with a cellophane pressure-sensitive adhesive tape leaving a ⅛ inch margin around the edge. The coating is allowed to dry in air, and the doctor knife blade raised to 7 mils above the base and an overcoating of a well milled mixture of 40 g. titanium dioxide pigment and 65 g. of the same binder applied. After air drying, the adhesive tape is removed and the coating cured for 2 hours at 110° C. A piece of the structure 3 inches by 3 inches, including an uncoated portion of the edge strip, is cut out and an electrically conductive silver paint containing finely divided silver particles (99+ percent pure), is sprayed on leaving a margin at the edge of at least ⅛ inch to provide insulation. Measurements are made of the light output at an applied field of 1000 cycles and 180 volts/mil. A brightness of 9 footlamberts is obtained.

An attempt is made to peel the phosphor-binder layer from the metallized film base support. It is noted that that the adhesion is excellent with no separation of the two layers. The flexible structure is placed around a 1.5 inch diameter cylinder to test the structure flexibility and operability under these conditions. The structure is easily bent around the cylinder with no separation of the layers or effect on operability noted when an alternating current is applied across the electrodes.

*Example II*

The procedure described in Example I is repeated except that the binder is prepared from a mixture of 145.2 g. of melamine-formaldehyde resin, 39 g. of the phthalic acid alkyd resin and 23.4 g. of the castor oil modified sebacic acid polyester resin described in Example I. The flexible structure is tested for brightness by the procedure described in Example I; a brightness of 8.5 footlamberts is obtained. Tests are made as described in Example I to determine adhesion and flexibility of the structure with similar results being obtained. This example illustrates the 60–20–20 binder composition is equivalent in brightness.

*Example III*

Example I is repeated except that a 0.5 mil. thick polyethylene terephthalate film is laminated to the metallized surface of the film base by means of an adhesive layer of polyethyl acrylate. The thin polyethylene terephthalate film layer protects the metallized surface of the base support from being destroyed by hydrogen sulfide or other gases evolved by the phosphor. The outer polyethylene terephthalate surface of the protective film is then coated with a binder-phosphor layer prepared as described in Example I but by substituting a yellow-emitting zinc sulfide phosphor (prepared by calcining in a dry H$_2$S atmosphere at 1100° C. for 1 hour a mixture of pure zinc sulfide activated by $5 \times 10^{-3}$ moles of copper and $2.5 \times 10^{-2}$ moles of manganese). The remainder of the coatings are as described in Example I. The structure emits light in a manner similar to the structures described in the previous examples when an alternating current is applied across the metallic electrodes. Test results similar to those described in Example I are obtained when the structure is tested as described in that example.

*Example IV*

Example I is repeated except that a 0.5 mil polyethylene terephthalate film is laminated to the metallized film base support as described in Example III, and a zinc sulfide phosphor activated with copper and antimony (prepared as described in Example I of assignee's Nitsche, U.S. application Serial No. 502,230, filed April 18, 1955, now abandoned) is used, and the titanium dioxide reflecting layer is omitted. Upon application of an alternating current the structure emits light in a manner similar to that described in the previous examples. Test results are similar to those previously described.

The melamine-formaldehyde resins used in the above examples are commercially available. In general, they are made from 1 to 6 moles of formaldehyde per mole of melamine (i.e. 30 to 180 parts of formaldehyde per 127 parts by weight of melamine).

The flexible electroluminescent structure is comprised of a flexible plastic film base or support. This support can be made from any hydrophobic film-forming organic resin or superpolymer or equivalent material. It is preferably polyethylene terephthalate film but other films can also be used, e.g. the polymethylene terephthalates disclosed in Whinfield and Dickson U.S. Patent 2,465,319; polyvinyl fluoride; poly(vinyl chloride co vinyl acetate); polyvinylidene fluoride and copolymers thereof with vinyl acetate or acrylonitrile etc.; polyacrylonitrile; polystyrene; cellulose derivatives e.g. cellulose nitrate, cellulose acetate, cellulose acetate butyrate and cellulose propionate. The film base or support should not be dissolved or swelled appreciably by the binder solvent or the electrically conductive metallic layer coated on the base support will be destroyed. In general, it can have a thickness from about 3 to 10 mils. The same types of polymer films can be used as the protective film, e.g., film 5 of Figure 3 of the drawing.

The flexible film base or support, as indicated above, can be coated by exposing one surface of the base support in turn to vapors of the desired metals while maintaining the system under a high vacuum. Prior to deposition of any metal, the surface of the film base support must be substantially clean, particularly free of oil. The electrically conductive metallic layer so produced should be light transmitting, i.e., should permit about 35 percent transmission of all incident visible light. Preferably, it is comprised of a thin copper substrate, having an equivalent thickness of about 4 to 8 millimicrons, on which is deposited a different electrically conductive metal, preferably silver, but zinc, aluminum, gold and platinum may be used. Copper alone may be used but bi-metallic layers give the best results.

The electrical resistivity of the bi-metallic layer should not be more than about 40,000 ohms/square and can be about 20 ohms/square or less. The equivalent thickness of the metallic layer supported by the copper substrate in the case of bi-metallic electrodes may range from about 1 to about 11 millimicrons, depending on the particular metal used. The term "equivalent thickness" means that thickness obtained by dividing the weight of metal calculated to have impinged on a surface by the product of the density of the metal in its customary massive state and the area of the surface on which the metal impinged. It is important that the optimum coating weight be used. As the coating weight is increased, the resistance decreases but conversely less light is transmitted. While greater coating weight is desirable, particularly when concerned with larger coating areas (conductance is thereby improved), it is also important that as much light as possible be transmitted through the metallic layer. These two conflicting points must be resolved for each embodiment and the optimum results obtained.

The plastic dielectric binder is preferably comprised of a mixture of melamine-formaldehyde, alkyd and polyester resins in an amount of from 30 to 85 percent by weight of the phosphor-binder layer. The adhesion and flexibility of the structure can be regulated by varying the proportions of components in the binder and the curing conditions. The melamine-formaldehyde resin, which is useful for coating purposes, can be alcohol-modified, but the specific alcohol used and its proportion can vary widely. Thus it can be methanol-, ethanol- or hexanol-modified. The resins tolerate more than 50 cc. of toluol, xylol, petroleum xylol or acetone per 100 g. of resin solution. In general, the resin is miscible with ethanol, butanol, higher alcohols such as capryl and octyl, methyl ethyl ketone, ethyl acetate, butyl acetate, etc. and can be admixed from solution in these solvents with the phosphor. The percentage of solids present in the solvent solution is 50%±2%.

The alkyd resins, e.g., phthalic acid alkyd resins, can be unmodified but preferably are also modified, i.e., with non-drying oils of the short and long oil type. Preferably the resin is derived from phthalic anhydride and a polyhydric alcohol, e.g., glycerol and is modified with 33 percent coconut oil and the solvent used is xylol. The polyester resin is a plasticizer derived from a polyhydric alcohol and an aliphatic dicarboxylic acid of from 6 to 10 carbon atoms, preferably, however, the polyester resin is derived from sebacic acid and glycerol and is modified with castor oil.

The phosphor which is embedded in the above-described resin binder may consist of an electroluminescent phosphor, present in from 70 to 15 percent by weight preferably 40 percent by weight, based on the phosphor-binder layer, e.g.

(1) Zinc sulfide, zinc selenide and zinc sulfo-selenide phosphors activated by copper and at least one element taken from the group consisting of arsenic, antimony and bismuth, particularly those described in aforementioned application Serial No. 502,230, now abandoned.

(2) Zinc sulfide phosphors activated by copper and containing a chloride flux compound, particularly those of aforementioned application Serial No. 713,548.

(3) Zinc sulfide phosphor activated by copper and manganese as disclosed in U.S. Patent 2,743,239 issued to Froelich. The instant invention is not limited, however, to the use of the above electroluminescent phosphors as any electroluminescent phosphor should give satisfactory results in the structure.

The thickness of the dried phosphor layers may vary from about 0.5 to 10 or more mils, depending on the voltage available for operation. At a given field more light is emitted from thicker layers until a point is reached where the gain in light is balanced by the loss due to scattering and absorption from the interior regions in the layer.

As previously indicated, optional coatings may be applied to the structure. A binder-white pigment reflecting layer can be applied between the phosphor-binder layer and the upper electrically conductive metallic layer. Titanium dioxide is preferred, but other pigments of high reflectivity may also be used, e.g., lithopone $$(BaSO_4—ZnS)$$

lead carbonate, lead sulfate, lead oxychloride and kaolin ($Al_2O_3.2H_2O.2SiO_2$). The reflecting layer adheres to the phosphor-binder layer because of the binder present in the mixture. A thin, pressure sensitive adhesive coated polyethylene terephthalate film, preferably 0.5 mil thick, may be placed between the transparent electrically conductive metallic layer and the phosphor-binder layer. Certain phosphors evolve traces of hydrogen sulfide, e.g., the zinc sulfide phosphor activated by copper and manganese of Froelich U.S. 2,743,239. If such phosphors are utilized, the thin polyethylene terephthalate film is desirable to protect the metallic coating layer. Materials, other than polyethylene terephthalate, which are not affected by the solvents used and which are relatively impermeable to hydrogen sulfide, are also suitable. The protective film layer may be made to adhere to the metallic coated film base support by the use of a polyethyl acrylate adhesive material. Other adhesives which may be used include: polybutyl acrylate, polyisobutyl acrylate, poly-2-ethylhexyl acrylate, copolyesters and polyesters composed of the esterification product of a glycol and a mixture of esters of (*a*) hexahydroterephthalic, terephthalic and sebacic acids, (*b*) terephthalic, isophthalic and sebacic acids, and (*c*) terephthalic and sebacic acids, and of esters of (*d*) hexahydroterphthalic acid.

The upper electrically conductive layer in intimate contact with the electroluminescent phosphor-binder layer is preferably silver, which may be coated on in the form of an electrically conductive silver paint which preferably contains finely divided silver particles (99+% pure), or deposited from metal vapors under high vacuum, leaving at least ⅛ of an inch margin around the coated layer edges to provide insulation. Other substances which can be used for the upper electrically conductive layer include, copper, zinc, aluminum and platinum. The layer thickness is not controlling because the upper thin metal coating does not have to be light transmissive.

The structures of the instant invention are useful for wall and ceiling panels, radio and telephone dials, instrument panels and clock faces. In addition, the structures may also be used to provide sufficient night illumination for light switches, electrical outlets, stair risers and on door push panels. The structures may also be applied to objects to produce decorative illumination.

Strong structures with good light output and long operating life are obtained through the use of the particular binder which has a high dielectric constant, good adhesion, good moisture resistance, controllable flexibility, and good stability. The structures are cheap, light in weight and can be produced as a continuous web, sold in rolls, cut by the user in various sizes and shapes, and used on non-planar surfaces. The transparent support through which the light is observed protects the delicate metallic layer from damage and also protects the observer from electric shock during operation. The use of a polyethylene terephthalate film barrier protects the metallic layer from the evolution of sulfur compounds from some phosphors, e.g., zinc sulfide, hydrogen sulfide fired phosphors.

As many apparently widely different embodiments of this invention may be made without departing from the spirit and scope thereof, it is to be understood that this invention is not limited to the specific embodiments thereof except as defined in the appended claims.

What is claimed is:

1. A flexible electroluminescent structure comprising a transparent hydrophobic macromolecular organic polymer film coated with a light transmitting electrically conductive metallic layer, a dielectric binder-phosphor layer thereover consisting essentially of a mixture of the following resins: 30 to 75% by weight melamine-formaldehyde, 5 to 50% by weight phthalic acid alkyd, and 5 to 50% by weight of a polyester derived from a polyhydric alcohol and an aliphatic dicarboxylic acid of 6 to 10 carbon atoms, with from 15 to 70% of a phosphor based on the weight of the binder-phosphor layer, and an electrically conductive metallic layer thereover in intimate contact with the binder-phosphor layer.

2. A structure as set forth in claim 1 wherein the first conductive layer has strata of two different metals.

3. A flexible electroluminescent structure comprising a transparent hydrophobic macromolecular organic polymer film coated with a light transmitting electrically conductive metallic layer, a thin film of a hydrophobic macromolecular organic polymer thereover, a dielectric binder-phosphor layer thereover consisting essentially of a mixture of the following resins: 30 to 75% by weight melamine-formaldehyde, 5 to 50% by weight phthalic acid alkyd and 5 to 50% by weight of a polyester derived from a polyhydric alcohol and an aliphatic dicarboxylic acid of 6 to 10 carbon atoms, with from 15 to 70% of a phosphor based on the weight of the binder-phosphor layer, and an electrically conductive metallic layer thereover in intimate contact with the binder-phosphor layer.

4. A structure as set forth in claim 3 wherein said thin film is a poly (polymethylene terephthalate) wherein the polymethylene radical contains 2 to 10 —$CH_2$— groups.

5. A flexible electroluminescent struture comprising a transparent hydrophobic macromolecular organic polymer film coated with a light transmitting electrically conductive metallic layer, a dielectric binder-phosphor layer thereover consisting essentially of a mixure of the following resins: 30 to 75% by weight melamine-formaldehyde, 5 to 50% by weight phthalic acid alkyd and 5 to 50% by weight of a polyester derived from a polyhydric alcohol and an aliphatic dicarboxylic acid of 6 to 10 carbon atoms, with from 15 to 70% of a phosphor based on the weight of the binder-phosphor layer, a white reflective pigment layer thereover, and an electrically conductive metallic layer thereover.

6. A flexible electroluminescent structure comprising a transparent hydrophobic macromolecular organic polymer film coated with a light transmitting electrically conductive metallic layer, a thin film of a hydrophobic macromolecular organic polymer thereover, a dielectric binder-phosphor layer thereover consisting essentially of a mixture of the following resins: 30 to 75% by weight melamine-formaldehyde, 5 to 50% by weight phthalic acid alkyd, and 5 to 50% by weight of a polyester derived from a polyhydric alcohol and an aliphatic dicarboxylic acid of 6 to 10 carbon atoms, with from 15 to 70% of a phosphor based on the weight of the binder-phosphor layer, a white reflective pigment layer thereover, and an electrically conductive metallic layer thereover.

7. A flexible electroluminescent structure comprising a polyethylene terephthalate film base support coated with a light transmitting electrically conductive layer of copper having silver deposited thereon, a dielectric binder-phosphor layer thereover consisting essentially of a mixture of the following resins: 30 to 75% by weight melamine-formaldehyde, 5 to 50% by weight phthalic acid alkyd, and 5 to 50% by weight of a polyester derived from a polyhydric alcohol and an aliphatic dicarboxylic acid of 6 to 10 carbon atoms, with from 15 to 70% of a phosphor based on the weight of the binder-phosphor layer, and an electrically conductive layer of silver thereover in intimate contact with the binder-phosphor layer.

8. A flexible electroluminescent structure comprising a polyethylene terephthalate film base support coated with a light transmitting electrically conductive layer of copper having silver deposited thereon, a dielectric binder-phosphor layer consisting essentially of a mixture of 50% melamine-formaldehyde, 20% phthalic acid alkyd and 30% sebacic acid polyester resins, with 40% of a phosphor of the zinc sulfide type based on the weight of the binder-phosphor layer, and an electrically conductive layer of silver thereover in intimate contact with the binder-phosphor layer.

References Cited in the file of this patent

UNITED STATES PATENTS

| | | |
|---|---|---|
| 2,566,349 | Mager | Sept. 4, 1951 |
| 2,733,367 | Gillson | Jan. 31, 1956 |

FOREIGN PATENTS

| | | |
|---|---|---|
| 204,854 | Australia | Dec. 13, 1956 |